United States Patent Office 2,722,544
Patented Nov. 1, 1955

2,722,544
TRIFLUOROMETHYL HALOGENATED DIPHENYLCARBAMIDE SULFONIC ACIDS AND THEIR PREPARATION

Henry Martin, Feuerthalen, Schaffhausen, Switzerland, assignor to Variapat A. G., Basel, Switzerland No Drawing. Application December 22, 1951,
Serial No. 263,023

Claims priority, application Switzerland
December 26, 1950

8 Claims. (Cl. 260—506)

The preparation of halogenated diarylcarbamide monosulfonic acids has been repeatedly described. Thus J. R. Scott and I. B. Cohen, J. Chem. Soc. (London) 123 II 3189 (1923) were the first who described the condensation of p-bromoaniline-o-sulfonic acid with phenylcarbimide. Similarly to this reaction U. S. Patent No. 2,363,074 discloses the condensation of 3,4-dichloroaniline-6-sulfonic acid with halogenated aromatic carbamic acid derivatives.

British Patent No. 536,047 describes the preparation of halogen substituted aromatic carbamide sulfonic acids by condensation of aromatic monoaminosulfonic acids with carbamic acid derivatives. Special use is made therein of aminodiphenylether sulfonic acids. Swiss Patent No. 215,310 describes the preparation of a product of condensation of 3,4-dichlorophenylisocyanate and 4-amino-4'-chloro-1,1'-diphenylether-3-sulfonic acid. This product, having a sulfonic acid group in o-position to the reacting amino group of the starting component, like the condensation products described above and the products disclosed in U. S.-Patent No. 2,363,074 have found no industrial use.

It has now been found surprisingly that the products of condensation prepared from halogen containing aminosulfonic acids of the benzene series having a sulfonic acid group in o-position to the amino group with halogen containing reactive carbonic acid or thiocarbonic acid derivatives are of special industrial importance provided that the final product of condensation contains at least one trifluoromethyl group and a sulfonic acid group in o-position to the acylated amino group.

These asymmetric, water soluble diarylcarbamide sulfonic acids containing trifluoromethyl groups are especially suitable for protecting wool, feathers, furs, hair, papers, textiles, leather skins, natural or synthetic fibres or articles containing said products against moth worms and other textile pests.

Said asymmetric diphenylcarbamide monosulfonic acids are different from the products disclosed in Brit. Patent No. 536,011 which are obtained by treating diphenylcarbamide disulfonic acids with phosgene and, therefore, are symmetric diphenylcarbamide disulfonic acids. As it will be seen from Tables I and II said products of condensation do not show any properties which make them suitable for industrial use.

Also the products of U. S.-Patent No. 2,363,074 prepared from 3,4-dichloroaniline-6-sulfonic acid with halogen substituted carbamic acid derivatives have found no industrial use and their effect is inferior to that obtained with products of condensation containing the trifluoromethyl group.

TABLE I

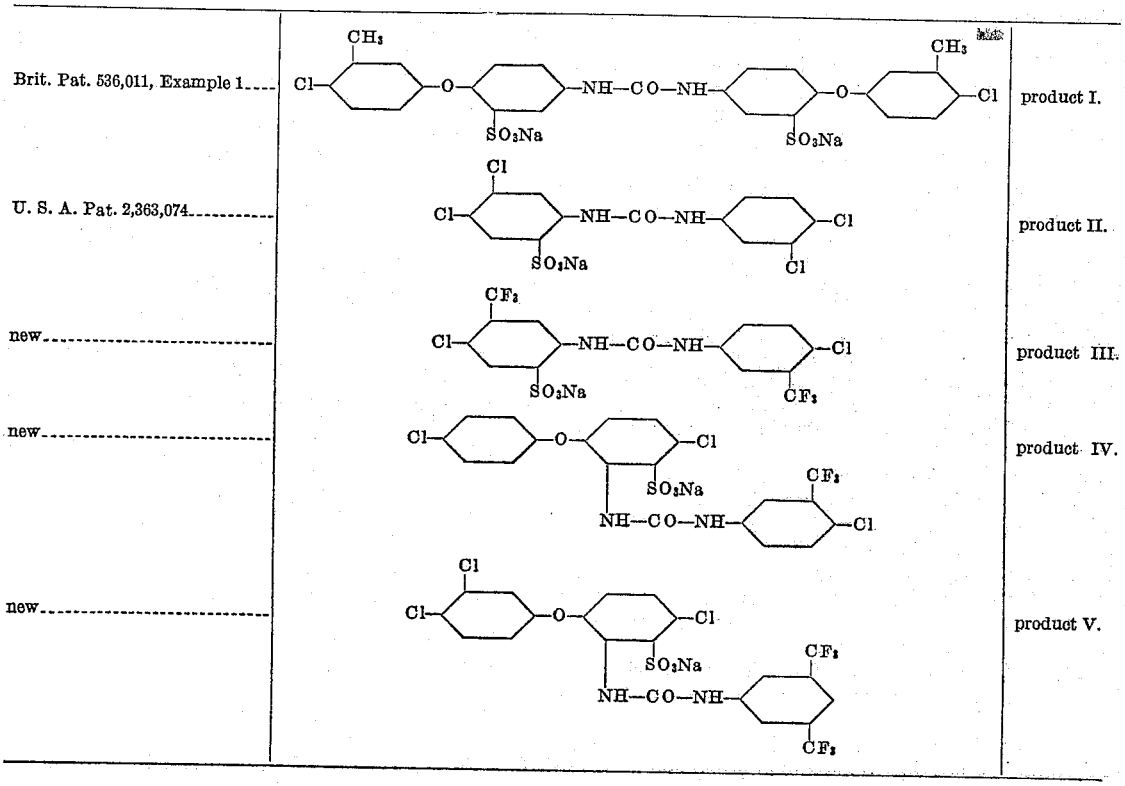

TABLE II

| Product | Fabric treated with 0.2% of mothproofing agent | | Fabric treated with 1% of mothproofing agent | |
|---|---|---|---|---|
| | dried | washed once | dried | washed once |
| I | − | − | − | − |
| II | − | − | + | − |
| III | + | + | + | + |
| IV | + | + | + | + |
| V | + | + | + | + |

+ = protected.
− = not protected.

As shown in Table II the known compounds do not show the valuable properties of the new products. The compounds are brought on wool like acid dyes and 10 moth-worms placed on each specimen. The percentage is calculated on the weight of treated fabric.

Aromatic carbonic acid derivatives or thiocarbonic acid derivatives which may be used for the condensation with the halogenated amino-o-sulfonic acids of the benzene series are for example halides, esters, amides, imides, or anhydrides of carbonic acid or thiocarbonic acid, whereby the expression carbonic acid halides means the reactive aromatic carbamic acid halides. The halogen- and/or alkyl-substituted arylcarbamic acid chlorides are of special value.

Said products of condensation may also be prepared with other carbamic acid derivatives for example by addition of carbamic acid anhydrides or substances producing such carbonic acid derivatives. Moreover the addition of aromatic isothiocyanic acid esters, especially of halogen substituted phenyl mustard oils on aromatic amino-o-sulfonic acids gives products which are soluble in water and of great interest. Similar products may be obtained by heating or melting of aminosulfonic acids with suitable carbamides or urethanes in suitable solvents or suspending agents whereby ammonia or alcohols or phenols are split-off.

A further two step process for preparing said water soluble halogen containing products of condensation, consists in reacting aromatic amines or their o-sulfonic acids with carbonic acid derivatives having two reactive groups, as for example halogen-carbonic acid esters, whereby said carbonic acid derivatives react first only on one side, whereupon said primary products of condensation may be condensed for example with amines containing the trifluoromethyl group so as to obtain the products of condensation containing the halogen groups. On the other hand one may also start with aromatic amino-o-sulfonic acids containing the trifluoromethyl group which are brought together with double reactive derivatives of carbonic acid, as for example halogen carbonic acid phenylester so as to obtain the primary condensation products containing the trifluoromethyl group, which latter are then reacted with any substituted amines of the benzene series to obtain the corresponding products of condensation containing a trifluoromethyl group.

Carbonic acid azides as well as N-halogenated carbonic acid amides of the benzene series when condensed with amino-o-sulfonic acids of the benzene series give also the desired carbamide derivatives with evolution of nitrogen or splitting-off hydrogen-halide. In all these methods the substitution of the components must be such that the end product contains at least one trifluoromethyl group and a sulfonic acid group in o-position to the acylated amino group. The trifluoromethyl group may be present in one or in both components of the condensation.

The aromatic aminosulfonic acids having a sulfonic acid group in o-position to the amino group and may also contain halogen may be obtained by known methods. Examples for such products are: 3,4-dichloroaniline-6-sulfonic acid, 1-amino-4-trifluoromethylbenzene-2-sulfonic acid, 1-amino-2,4-dichloro-5-trifluoromethylbenzene-6-sulfonic acid, 1-amino-4-chloro-2-trifluoromethylbenzene-6-sulfonic acid, 1-amino-4-chloro-3-trifluoromethlybenzene-6-sulfonic acid, 1-amino-4-methoxy-5-trifluoro-methylbenzene-2 - sulfonic acid, 1 - amino - 3 - trifluoromethylbenzene-4-methylsulfone-6-sulfonic acid, 4-bromoaniline-6-sulfonic acid. Higher molecular aromatic o-aminosulfonic acids are for example: aminodiphenylether sulfonic acids prepared by condensation of halogenphenols with 3,4-dichloro-nitrobenzene-6-sulfonic acid to form halogen containing nitro-diphenylether sulfonic acid having a sulfonic acid group in o-position to the nitro group. By reducing for example according to the method of Béchamp one obtains a halogen containing aminodiphenylethermonosulfonic acid. Or they may be obtained by baking the aminodiphenylethers according to the method described in German Patent No. 169,357 or by sulfonation of the aminodiphenylethers with chlorosulfonic acid in organic solvents according to the method of German Patent No. 541,258. As examples we mention: 2,3',4'-trichloro-1,1'-diphenylether-4-amino-5 - sulfonic acid, 4',6'-dichloro-1,1'-diphenylether-4-amino-5-sulfonic acid, 2,4'-dichloro-1,1'-diphenylether-4-amino-5-sulfonic acid, 2,4'-dichloro-5'-methyl-1,1'-diphenylether-4-amino-5-sulfonic acid, 3',4' - dichloro - 1,1' - diphenylether-4-amino-5-sulfonic acid, 4,4'-dichloro-1,1'-diphenylether-2-amino-3-sulfonic acid, 4'-chloro-1,1'-diphenylether-4-amino-5-sulfonic acid, 2,4'-dichloro-1,1'-diphenylsulfide-4-amino-5 - sulfonic acid, 4' - methyl - 2'-chloro-1,1'-diphenylether-4-amino-5-sulfonic acid, 3',4'-chloro-5'-methyl-1,1'-diphenylether-4-amino - 5 - sulfonic acids, 4'-tert. amyl-2'-chloro-1,1'-diphenylether-4-amino-5-sulfonic acid, 2-trifluoromethyl-1,1' - diphenylether - 4-amino-5-sulfonic acid, 2-trifluoromethyl-4'-chloro-1,1'-diphenylether-4-amino-5-sulfonic acid; 2-trifluoromethyl-3'-methyl-4'-chloro-1,1'-diphenylether-4 - amino - 5 - sulfonic acid, 2-trifluoromethyl-3',4'-dichloro-1,1'-diphenylether-4-amino-5-sulfonic acid, 3,4',4'-trichloro-1,1'-diphenylether-2'-amino-3'-sulfonic acid.

Aromatic carbonic acid derivatives, which may be used for the condensation with the aminosulfonic acids of the benzene series having a sulfonic acid group in o-position to the amino group are the amides, imides or anhydrides of carbonic acid or thiocarbonic acid, whereby the expression carbonic acid halides embraces for example the reactive carbamic acid halides. Halogen and/or alkyl-substituted carbamic acid chlorides have been found to be espectially valuable. Said products of condensation may also be prepared with other carbamic acid derivatives for example by addition of carbamic acid anhydrides or agents forming such carbonic acid derivatives. By heating or melting in suitable solvents or suspending agents the aminosulfonic acids with suitable carbamides or urethanes similar products may be obtained splitting-off ammonia or alcohols. Moreover the addition of aromatic isothiocyanic acid esters especially of halogen substituted mustard oils on o-aminosulfonic acids gives products of industrial interest.

The carbamic acid halides, halogen carbonic acid esters, isocyanic acid esters and mustard oils may be obtained by methods known per se. By reaction of the primary amines like aniline, toluidines, xylidines, halogen substituted anilines like 4-chloroaniline, 2-chloroaniline, 3,4-dichloroaniline, 2,5-dichloroaniline, 2,4-dichloroaniline, 4-chloro-2-aminophenylmethylsulfone, 2,3 - dichloroaniline, 3 - chloro - 4 - methyl - 6 - methoxyaniline, 4-nitraniline, 4-ethylaniline, 3,4,5 - trichloroaniline, 2,4,5-trichloroaniline, 4-aminoacetophenone, 1-amino-3-trifluoromethylbenzene, 1 - amino - 4 - trifluoromethylbenzene, 1 - amino - 2 - trifluoromethylbenzene, 1-amino - 2 - methoxy - 5 - trifluoromethylbenzene, 1-amino - 2 - chloro - 5 - trifluoromethylbenzene, 1 - amino- 3,5 - bis - trifluoromethylbenzene, 1 - amino - 4 - chloro- 5 - trifluoromethylbenzene, 1 - amino - 2,5 - bis - trifluoromethylbenzene, 1 - amino - 2 - chloro - 5 - trifluoromethylbenzene, 4 - amino - 1,1' - diphenylether, 2 - amino - 1,1' - diphenylether, 4 - amino - 4' - chloro- 1,1' - diphenylether, 4 - amino - 2' - chloro - 1,1' - diphenylether, 4 - amino - 2',4' - dichloro - 1,1' - diphenylether, 4 - amino - 3',4' - dichloro - 1,1' - diphenylether, 4 - amino - 3' - methyl - 4' - chloro - 1,1'- diphenylether, 4 - amino - 3',5' - dimethyl - 4' - chloro - 1,1' - diphenylether, 4 - amino - 4' - methyl - 1,1'- diphenylether, 4 - amino - 4' - amyl - 1,1' - diphenylether, 4 - amino - 2,4' - dichloro - 1,1' - diphenylether, 4 - amino - 2,3',4' - trichloro - 1,1' - diphenylether, 4 - amino - 4' - chloro - 1,1' - diphenylsulfide, 4 - amino- 3',4' - dichloro - diphenylsulfide, 4 - amino - 2,4' - dichloro - 1,1' - diphenylsulfide, 2 - amino - 4' - chlor- 1,1' - diphenylsulfide, 2 - amino - 3',4' - dichloro - 1,1'- diphenylsulfide, 2 - amino - 4,4' - dichloro - 1,1' - diphenylether, 2 - amino - 4,4' - dichloro - 1,1' - diphenylsulfide, 1 - amino - 4 - chloro - 4' - methyl - 1,1'- diphenylether, 2 - amino - 4,3',4' - trichloro - 1,1'- diphenylether, 2 - amino - 3' - methyl - 4,4' - dichloro- 1,1' - diphenylether, 4 - amino - 4' - chlorodiphenyl- 4 - chloro - 3' - amino - diphenylenoxide, 2 - amino - 4'- chloro - 4 - trifluoromethyl - 1,1' - diphenylether, 2- amino - 4' - methyl - 4 - trifluoromethyl - 1,1' - diphenylether, 2 - amino - 4' - amyl - 4 - trifluoromethyl - 1,1'- diphenylether, 2 - amino - 4' - chloro - 4 - trifluoromethyl - 1,1' - diphenylsulfide, 2 - amino - 3' - trifluoromethyl - 1,1' - diphenylether, 2 - amino - 4 - chloro - 3' - trifluoromethyl - 1,1' - diphenylether, 4 - amino - 2 - trifluoromethyl - 1,1' - diphenylether, 4 - amino - 2 - trifluoromethyl - 4' - chloro - 1,1' - diphenylether, 4 - amino - 2 - trifluoromethyl - 2',4' - dichloro - 1,1' - diphenylether, 4 - amino - 2 - trifluoromethyl - 4' - methyl- 1,1' - diphenylether, 4 - amino - 2 - trifluoromethyl - 3'- methyl - 4' - chloro - 1,1' - diphenylether, 4 - amino- 2 - trifluoromethyl - 4' - amyl - 1,1' - diphenylether, 4 - amino - 2 - trifluoromethyl - 3',4' - dichloro - 1,1' - diphenylether etc. with phosgene the carbamic acid chlorides are obtained by a simple reaction. By suitable reactions known to anyone skilled in the art the carbamic acid chlorides may easily be transformed into the isocyanic acid esters. Disguised isocyanates the so-called isocyan-splitting substances as for example the water soluble adducts of isocyanate a bisulfite and the like react in a similar manner.

By heating phenols and the like with phosgene in the presence of tertiary bases the reactive chlorocarbonic esters are formed. On the other hand isothiocyanates are obtained from amines with known methods.

*Example 1*

12.1 parts by wt. 3,4-dichloroanilinesulfonic acid are dissolved in 60 parts by volume of hot anhydrous pyridine cooled to 40° C. and admixed with 11.07 parts by wt. of 4-chloro-3-trifluoromethylphenylisocyanate dissolved in 25 parts by volume of anhydrous pyridine. The mixture heats up to 50° C. After standing for half an hour the mixture is heated for one hour on the waterbath and then let stand over night. The mixture is then poured in 200 parts by volume of water and neutralised with concentrated hydrochloric acid. The new sulfonic acid precipitates and is collected by filtering by means of suction, washed with water and boiled with 2000 parts of hot water and 12 parts by weight of sodium carbonate, mixed with charcoal and filtered while still hot. The filtrate is admixed with 80 parts by volume of concentrated sodium chloride solution and boiled up again. Upon cooling the product of condensation separates in crystalline form from the clear solution. It is collected by filtering with suction, washed with a little amount of cold water, and dried. The yield is good. The product has the following formula:

(6)

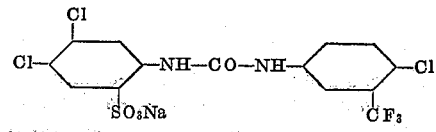

The 4-chloro-3-trifluoromethylphenylisocyanate is prepared by treating 4-choloro-trifluoromethylaniline in benzene solution with phosgene, whereby the carbamic acid chloride is formed as intermediate product. The isocyanate boils in the venge of 91–92° C. at 14 mm. pressure. Instead of the isocyanate the 4-chloro-3-trifluoromethyl-phenylcarbamic acid chloride may be used.

*Example 2*

When 3,5-bis-trifluoromethyl-phenylisocyanate Bp 37 84–86° C. is used the product of condensation has the following formula:

(7)

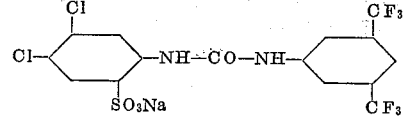

*Example 3*

13.8 parts by weight of 4-chloro-3-trifluoromethylaniline-6-sulfonic acid are dissolved in 70 parts by volume of hot anhydrous pyridine and mixed at 40° C. with a solution of 12 parts by weight of 3,4-dichlorophenylisocyanate in 25 parts by weight of anhydrous pyridine. The temperature rises up to 55° C. The mixture is heated for one hour on the waterbath and let stand over night. Then it is poured in 200 parts of water cooled with ice and the product of condensation precipitated with concentrated hydrochloric acid. It is collected by filtering with the aid of suction washed with water and boiled up in 3500 parts by volume of water and 12 parts by weight of sodium carbonate, admixed with charcoal and filtered while still hot. The filtrate is admixed with 650 parts by volume of saturated sodium chloride solution and let stand over night. The crystalline product of condensation is filtered with suction washed with a small amount of water and dried. It has the following formula:

(8)

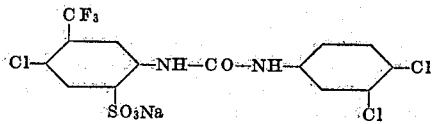

*Example 4*

If 3,5-bis-trifluoromethyl-isocyanate is used the product of condensation has the following formula:

(9)

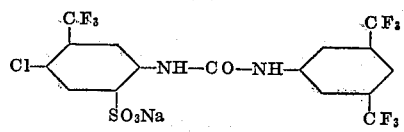

*Example 5*

If the 3,4-dichlorophenylisocyanate of Example 3 is replaced by 3-trifluoromethyl-4-chlorophenylisocyanate, the following condensation product is obtained under similar conditions:

(10)

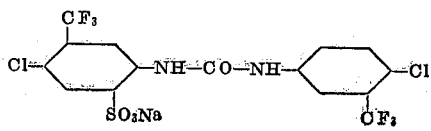

The product forms a clear solution in hot water which upon cooling forms a jelly-like mass. From its solution in acetonitrile the product crystallises in wonderful crystals.

*Example 6*

If 4-chloro-3-trifluoromethylaniline-6-sulfonic acid is condensed with 3-trifluoromethylphenylisocyanate the 3',5-bis-trifluoromethyl-4-chloro - 1,1'-diphenylcarbamide-2-sulfonic acid is obtained under similar conditions as in Example 3. It has the following formula:

(11)

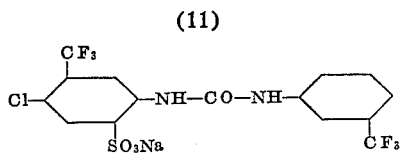

If 3-trifluoromethyl-6-chlorphenylisocyanate is condensed under similar conditions the 2',4-dichloro-5,5'-bis-trifluoromethyl-1,1'-diphenylcarbamide-2-sulfonic acid of the following formula:

(12)

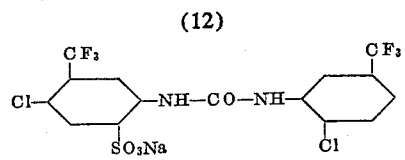

is obtained.

*Example 7*

9.18 parts by weight of 2-chloro-5-trifluoromethyl-aniline-6-sulfonic acid, prepared by sulfonation of 2-chloro-5-trifluoromethylaniline with chlorosulfonic acid in o-dichlorobenzene, are dissolved in 60 parts by volume of anhydrous pyridine and heated to 70° C. To this solution are added 7.18 parts by weight of 2-chloro-5-trifluoromethylisocyanate dissolved in 40 parts by volume of anhydrous pyridine. After a short period of time a precipitate separates out and the condensation is substantially ended after heating 4 hours on a waterbath. The mixture is allowed to stand over night. After addition of a small amount of water the mixture is poured on 200 parts by weight of ice and then acidified with concentrated HCl. A fine white precipitate separates out, which is collected on a suction filter and washed with water. The wet product is admixed with 1500 parts by volume of distilled water at 890° C. and 2 parts of sodium carbonate and boiled, after addition of 4 parts of charcoal it is filtered while hot and admixed at 70° C. with 50 parts by volume of concentrated sodium chloride solution. The product of condensation precipitates in crystalline form, it is filtered by suction and has the following formula:

(13)

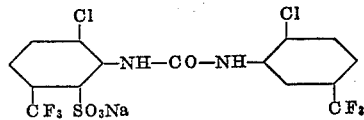

*Example 8*

If 3-trifluoromethyl-4-chlorophenylisocyanate is used instead of 2-chloro-5-trifluoromethylphenyl-isocyanate a product having the following constitution is obtained:

(14)

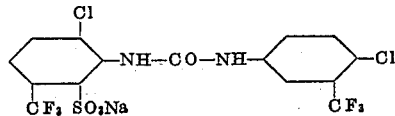

*Example 9*

If 3,5-bis-trifluoromethylphenyl-isocyanate is used the product of condensation has the following formula:

(15)

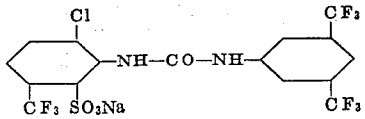

*Example 10*

To an aqueous emulsion of 1/10 mol. of 3,4-dichloro-6-sulfophenyl-1-O-phenylurethane are given an excess of 3-trifluoromethyl-4-chloroaniline and heated several hours on a water bath. The unreacted 3-trifluoromethyl-4-chloroaniline is then distilled off with steam and the contents of the flask saturated with sodium chloride. The aqueous brine is then separated from the precipitate and the latter dissolved in hot water, whereby the mixed carbamide separates out in crystalline form upon cooling. Its properties and constitution are identical to the product of Example 1.

*Example 11*

1/20 mol. of 3,4-dichlorobenzoylazide are dissolved in xylene and slowly heated to 40–50° C. An equimolecular amount of 3-trifluoromethyl-4-chloroaniline - 6 - sulfonic acid is added to said solution and slowly heated to 90° C. while stirring. When the mixture has been heated for one hour at 90° C. it is heated for a further hour at 120° C. After cooling a solution of sodium bicarbonate is added and the solvent distilled off with steam and filtered while hot. When saturated sodium chloride solution is added the asymmetric carbamide separates out in crystalline form. It has the same properties and constitution as the product described in Example 3.

*Example 12*

1/20 mol. of p-chlorobenzoic acid chloramide (obtained by introducing of an equivalent amount of chlorine into an aqueous suspension of p-chlorobenzamide at 10–15° C.) is slurried in water and this slurry admixed with the equivalent amount of 3-trifluoromethyl-4-chloroaniline-6-sulfonic acid at a temperature of 5–10° C. and vigorously stirred. At the same temperature the calculated amount of 30% sodium hydroxide solution is added slowly drop by drop so that the temperature does not exceed 20° C. While slowly stirring the paste becomes thicker and thicker. The temperature rises slowly to 30° C. and then to 40–45° C. When the temperature begins to fall the mixture is heated for half an hour to 50° C. on the water bath. After cooling the mixture is extracted with ether and the aqueous part boiled in water, filtered while hot and admixed with concentrated sodium chloride solution, whereupon the asymmetric urea separates out upon cooling, in crystalline form. It has the following formula:

(16)

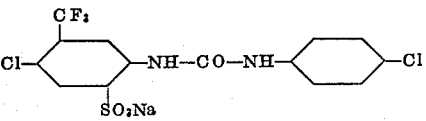

*Example 13*

1/20 mol. of 3-trifluoro-4-chloroaniline-6-sulfonic acid is reacted in anhydrous pyridine with an equimolecular amount of 4-chlorophenyl-mustard oil. The temperature raises up to 35° C. After one hour the reaction mixture is heated for one hour and a half on the water bath then admixed with bicarbonate solution and the pyridine blown-off with steam. After addition of 250 parts of hot water there is added charcoal and filtered while hot. Upon addition of saturated sodium chloride solution the thiocarbamide precipitates as a resin. It is dried in vacuo and forms then a product giving clear solutions in water. Its formula is as follows:

(17)

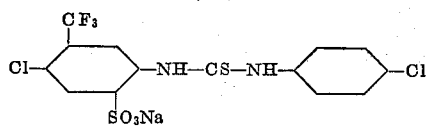

Example 14

Wool or a material containing wool is boiled during 45 minutes to one hour with 1% (calculated on wool) of the product of Example 5, 3–5% of sulfuric acid and 10% of crystallised Glaubers salt. Then the product is rinsed and dried. The so treated product is moth-proof.

Example 15

17 parts by weight of the sodium salt of 4-amino-2,4'-dichloro-1,1'-diphenylether-5-sulfonic acid are suspended in 100 parts by volume of acetonitril, admixed with a solution of 10.5 parts by weight of 3-trifluoromethyl-4-chlorophenyl-isocyanate in 10 parts by volume acetonitril and heated on the water bath. After heating 4 hours with reflux the mixture is treated with charcoal, filtered and evaporated in vacuo. The residue is a brittle mass which gives clear solutions in water. The product is dissolved in 250 parts by volume of hot water and poured in 1200 parts by volume of hot water treated with 2 parts by weight of charcoal and filtered. The solution is boiled again and admixed with 48 parts by volume of saturated sodium chloride solution. Upon cooling the new product of condensation separates in form of an oil which becomes crystalline. Yield 193 parts by weight. The carbamide has the following formula:

(18)

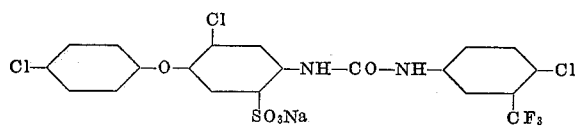

Instead of 3-trifluoromethyl-4-chlorophenylisocyanate the 3 - trifluoromethylphenylisocyanate, the 3 - trifluoromethyl-6-chlorophenyl-isocyanate or the bis-3,5-trifluoromethyl-phenylisocyanate may be used.

The 4 - amino - 2,4'-dichloro-1,1'-diphenylether-5-sulfonic acid is prepared by condensation of p-chlorophenolate with 3,4-dichloro-6-sulfonitrobenzene and reduction of the product of condensation.

4 - amino - 2,4' - dichloro - 5' - methyl - 1,1' -diphenyl-ether-5-sulfonic acid may be used instead of 4-amino-2,4'-dichloro-1,1'-diphenylether-5-sulfonic acid. When condensed with 3-trifluoromethyl-4-chlorophenyl-isocyanate a product having the following formula is obtained.

(19)

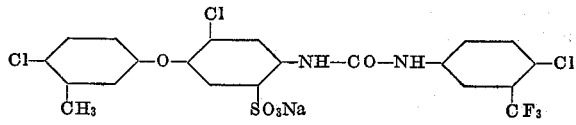

The condensation may also be effected with the corresponding carbamic acid chloride in anhydrous pyridine.

Example 16

1/30 mol of the sodium salt of 4-amino-4'-chloro-1,1'-diphenylether-5-sulfonic acid are suspended in 100 parts by volume of anhydrous acetonitril, admixed with an equivalent amount of 3-trifluoromethyl-6-(3',5'-dimethyl-phenoxy)-phenyl-1-isocyanic acid ester and boiled for 4 hours with reflux, then admixed with charcoal, boiled and filtered. The solvent is then evaporated in vacuo. A brittle mass remains which gives a clear solution in hot water. The product has the following formula:

(20)

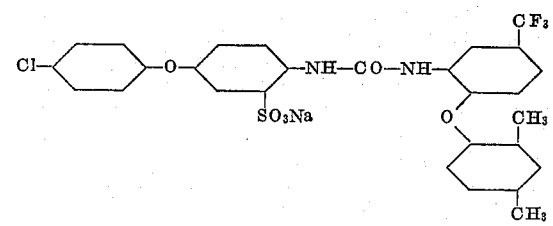

The corresponding condensation of the sodium salt of 4 - amino - 2,4' - dichloro - 1,1' - diphenylether - 5 - sulfonic acid with 3-trifluoromethyl-6-(4'-chlorophenoxy)-phenyl-1-isocyanate gives the following product:

(21)

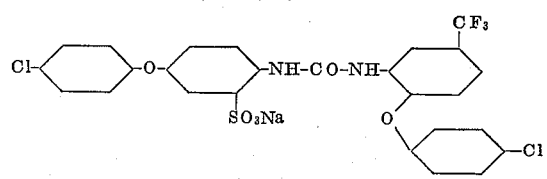

Instead of the isocyanate the carbamic acid chloride may be used.

Example 17

1/30 mol of the sodium salt of 4-amino-2,4',5'-trichloro-1,1'-diphenylether-5-sulfonic acid are suspended in 150 parts by wt. of anhydrous acetonitril and admixed with the equimolecular amount of 3-trifluoromethyl-4-chlorophenylisocyanate. The mixture is further processed in a similar manner as in Example 15. A solid product of the formula:

(22)

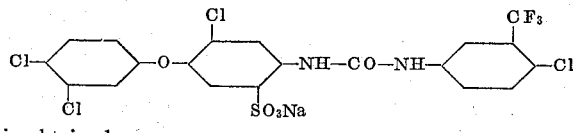

is obtained.

Instead of 3-trifluoromethyl-4-chlorophenylisocyanate the 3-trifluoromethyl-4-chlorophenylcarbamic acid chloride may be used.

With 4 - amino - 2,4',6'-trichloro-1,1'-diphenylether-5-sulfonic acid the following product is obtained:

(23)

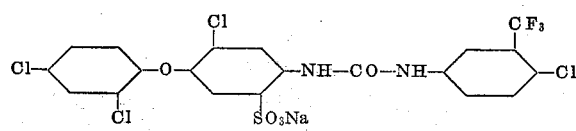

When starting with 2-amino-4,4'-dichloro-1,1'-diphenylether-3-sulfonic acid and 3-trifluoromethyl-4-chlorophenylisocyanate the following product is obtained:

(24)

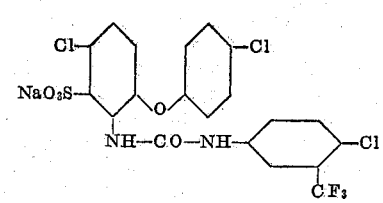

Instead of 3-trifluoromethyl-4-chloro-phenylisocyanate the corresponding isocyanic acid chloride may be used.

Example 18

1/30 mol of 4-amino-2,4'-dichloro-1,1'-diphenylether-5-sulfonic acid are suspended in 100 parts by volume of anhydrous pyridine and admixed with the equivalent amount of 3-trifluoromethylphenyl-mustard oil at a temperature of 30° C. The temperature raises up to 35° C. When the sulfonic acid is dissolved the mixture is heated for a further hour on the water bath. The solution is admixed with a small amount of sodium bicarbonate and the pyridine then blown off with steam. After addition of 500 parts by volume of hot water the solution is treated with charcoal and filtered. Upon addition of concentrated sodium chloride solution the product separates in resinous form. It is dried in vacuo and forms then a powder which gives clear solutions in water. It has the following formula:

(25)

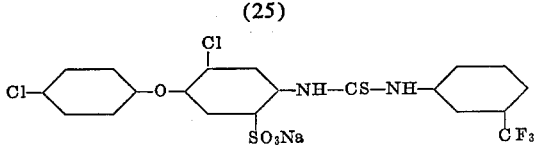

Example 19

1/25 mol of 2,4'-dichloro-5-sulfo-1,1'-diphenylether-4-O-phenylurethane prepared from the sodium salt of 4-amino-2,4-dichloro-1,1'-diphenylether-5-sulfonic acid and chlorocarbonic acid phenylester are suspended in water and heated several hours on the water bath with an excess of 3-trifluoromethyl-4-chloroaniline. The unreacted 3-trifluoromethyl-4-chloraniline is distilled-off with steam and the residue saturated with sodium chloride. The aqueous brine is separated from the precipitated oil. When the latter is dissolved in a small amount of warm water it begins to crystallize. The obtained colorless crystals are identical to the product of Example 15.

Example 20

12 parts of the product of condensation of 4-amino-5'-methyl-1,1'-diphenylether-5-sulfonic acid and 3-trifluoromethyl-4-chlorophenylisocyanate are dissolved in 60 parts by volume of glacial acetic acid and treated 1 hour with chlorine. The product of the chlorination is precipitated with water, containing hydrochloric acid, in form of a watersoluble, semi-solid, crumbly mass. The sulfonic acid is transformed into its sodium salt, which after drying forms a clear powder. It corresponds probably to the following formula (26)

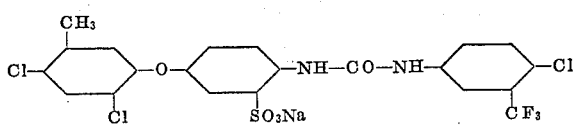

Example 21

Wool or a material containing wool is boiled for 1 hour with 0.6% (calculated on wool) of the product of Example 15, 3–5% sulfuric acid and 10% crystalline Glaubers salt. Then the product is rinsed and dried. It is moth-proof.

Example 22

11.8 parts by weight of the sodium salt of 2-amino-4,4'-dichloro-1,1'-diphenylether-3-sulfonic acid are suspended in 80 parts by volume of anhydrous acetonitril, whereupon 2-trifluoro-6-chlorophenyl-isocyanate dissolved in 30 parts by volume of anhydrous acetonitril are added at room temperature. The mixture is heated on the water bath with reflux until solution is completed within about 25 minutes. After 1 hour a white precipitate separates out. The mixture is heated for three further hours and the thick slurry filtered by suction after cooling. The residue is washed with a little acetonitril and dried. Yield 17.5 parts by weight. This product was slurried in 500 parts by volume of distilled water at a temperature of 80° C. and poured into 2000 parts by volume of water at 80° C., whereby almost the whole amount is dissolved. After addition of 2 parts of charcoal the solution is filtered hot and 360 parts by volume of concentrated solution of sodium chloride are added at 70° C. The crystalline product has the following formula:

(27)

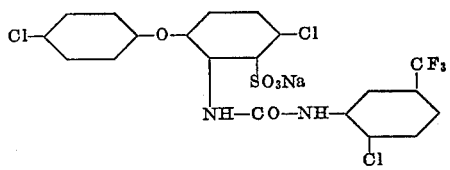

Example 23

11.87 parts by weight sodium salt of 2,4-dichloro-1,1'-diphenylether-4'-amino-5'-sulfonic acid and 6 parts 3-trifluoromethyl-4-chlorophenyl-isocyanate are suspended in 70 parts by volume of anhydrous acetonitril and heated 24 hours on the water bath with reflux. After 15 hours the mixture has become finer and more voluminous. It is filtered with suction. Yield after drying 18 parts by weight said 18 parts are dissolved in 900 parts by volume distilled water at 80° C., filtered and admixed with 30 parts by volume of concentrated sodium chloride solution. The product of condensation first separates as an oil which solidifies after some time. It is filtered by suction and dried in vacuo at 100° C. Its constitution is as follows:

(28)

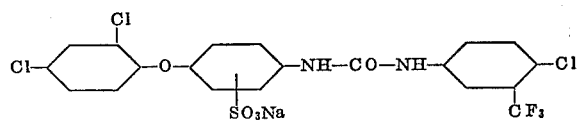

With 3-trifluoromethyl-6-chlorophenylisocyanate the product with the following formula is obtained.

(29)

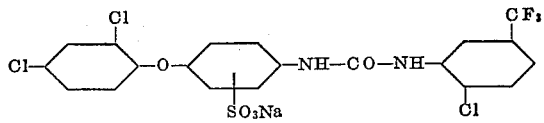

Example 24

10.7 parts by weight of 4-chloro-1,1'-diphenylether-4'-amino-5-sulfonic acid (sodium salt) are suspended in 60 parts by volume of acetonitril admixed with a solution of 3-trifluoromethylphenylisocyanate in 40 parts by volume of acetonitril and heated with reflux. After 26 hours the little non dissolved material is filtered off, cooled with ice and the separated product of condensation filtered with suction. It is washed three times with little acetonitril and dried in vacuo at 90–108° C. Yield 15 parts by weight. The formula of the product is as follows:

(30)

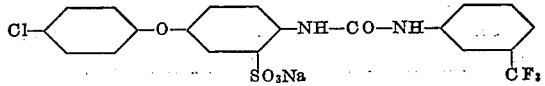

If the corresponding amount of bis-3,5-trifluoromethylphenyl-isocyanate is used the product of the following formula is obtained:

(31)

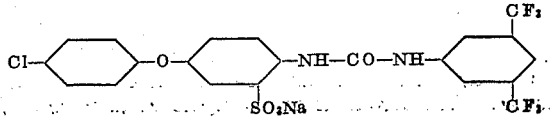

Example 25

13.02 parts by weight of the sodium salt of 4-amino-2,2',4'-trichloro-1,1'-diphenylether-5-sulfonic acid are given to 60 parts by volume of anhydrous acetonitril and mixed with 8.5 parts by weight of bis-3,5-trifluoromethylphenylisocyanate dissolved in 40 parts by volume of anhydrous acetonitril. The mixture dissolves within 5 minutes on the water bath. After 4 hours the little undissolved is filtered off, the solution treated with charcoal and filtered. The solvent is evaporated finally in vacuo. The product of condensation is stirred into 2500 parts by volume of water at 90° C. treated with 2 parts by weight of charcoal and filtered hot. The filtrate is salted out with 40 parts by volume of sodium chloride solution at 90° C., filtered and washed 4 times with a little distilled water. Yield 13.5 parts by weight. The product has the following formula:

(32)

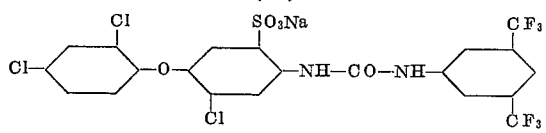

A great number of the compounds disclosed herein may be designated by the general formula

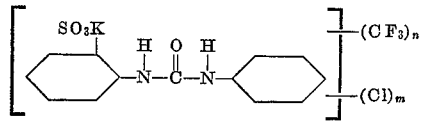

where $n$ and $m$ are numbers from 1 to 3 and K is an alkali metal cation.

What I claim is:

1. A trifluoromethyl substituted halogenated sulfonic acid derivative of urea, the compound having the general formula:

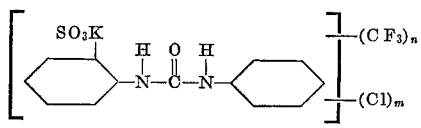

where $m$ is a number from 1 to 3 inclusive and where $n$ is a number from 1 to 3 inclusive, and K is an alkali metal cation.

2. The compound as claimed in claim 1, one chlorine being meta to the sulfonic acid group and para to the nitrogen.

3. The new chemical compound of the formula

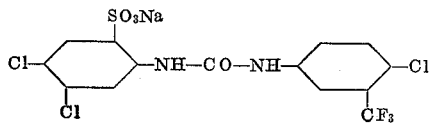

4. The new chemical compound of the formula

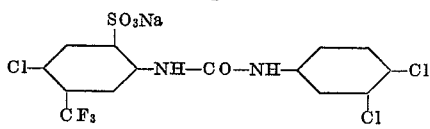

5. The new chemical compound of the formula

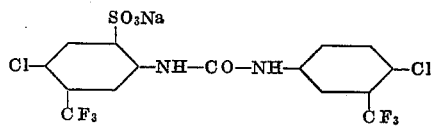

6. The new chemical compound of the formula

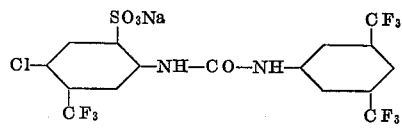

7. The new chemical compound of the formula

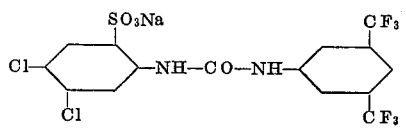

8. Process for the production of new water soluble colourless products of condensation, which comprises reacting an alkali salt of an aminophenylsulfonic acid of the formula

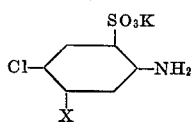

in an anhydrous solution medium selected from the group consisting of acetonitrile and pyridine, with a phenylisocyanate of the formula

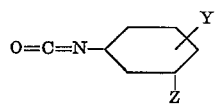

in which formulas one of the symbols X and Z signifies the trifluoromethyl group and the remaining symbol signifies a substituent selected from the group consisting of chlorine and the trifluoromethyl group and Y is a substituent selected from the group consisting of chlorine and the trifluoromethyl group which may be in a position to Z selected from the position ortho and meta and K signifies an alkali cation, and isolating the obtained diphenyl urea by treating the reaction mass with sodium chloride solution.

References Cited in the file of this patent

UNITED STATES PATENTS

| | | |
|---|---|---|
| 2,119,882 | Kracker et al. | June 7, 1938 |
| 2,141,893 | Zitscher et al. | Dec. 27, 1938 |
| 2,311,062 | Martin et al. | Feb. 16, 1943 |
| 2,328,159 | Martin et al. | Aug. 31, 1943 |
| 2,363,074 | Martin et al. | Nov. 21, 1944 |
| 2,424,477 | Martin et al. | July 22, 1947 |
| 2,649,476 | Martin | Aug. 18, 1953 |